US011358865B2

(12) United States Patent
Ito et al.

(10) Patent No.: US 11,358,865 B2
(45) Date of Patent: Jun. 14, 2022

(54) SPHERICAL ALUMINUM NITRIDE POWDER AND METHOD FOR PRODUCING SPHERICAL ALUMINUM NITRIDE POWDER

(71) Applicant: MARUWA CO., LTD., Owariasahi (JP)

(72) Inventors: Fuyuki Ito, Toki (JP); Daisuke Kato, Toki (JP); Mitsutaka Takahashi, Toki (JP)

(73) Assignee: MARUWA CO., LTD., Owariasahi (JP)

( * ) Notice: Subject to any disclaimer, the term of this patent is extended or adjusted under 35 U.S.C. 154(b) by 0 days.

(21) Appl. No.: 17/262,103

(22) PCT Filed: Aug. 5, 2019

(86) PCT No.: PCT/JP2019/030687
§ 371 (c)(1),
(2) Date: Jan. 21, 2021

(87) PCT Pub. No.: WO2020/031947
PCT Pub. Date: Feb. 13, 2020

(65) Prior Publication Data
US 2021/0246024 A1    Aug. 12, 2021

(30) Foreign Application Priority Data

Aug. 6, 2018  (JP) .............................. JP2018-147554
Aug. 2, 2019  (JP) .............................. JP2019-142755

(51) Int. Cl.
*C01B 21/072*    (2006.01)
*C04B 35/581*    (2006.01)

(52) U.S. Cl.
CPC .......... *C01B 21/072* (2013.01); *C04B 35/581* (2013.01)

(58) Field of Classification Search
CPC ........................................ C01B 21/072–0728
See application file for complete search history.

(56) References Cited

U.S. PATENT DOCUMENTS

| | | | |
|---|---|---|---|
| 2013/0164534 A1* | 6/2013 | Muneoka | C04B 35/6265 |
| | | | 428/402 |
| 2014/0042675 A1 | 2/2014 | Chung et al. | |
| 2019/0202697 A1* | 7/2019 | Jeong | C01B 21/072 |

FOREIGN PATENT DOCUMENTS

| | | |
|---|---|---|
| CN | 103979507 A | 8/2014 |
| JP | H03-295863 A | 12/1991 |

(Continued)

OTHER PUBLICATIONS

Kallel. Spectra, energy levels and crystal field calculation of Er3+ doped in AlN nanoparticles. Journal of Luminescence vol. 171, Mar. 2016, pp. 42-50 (Year: 2016).*

(Continued)

*Primary Examiner* — Matthew E. Hoban
(74) *Attorney, Agent, or Firm* — Shumaker, Loop & Kendrick, LLP

(57) ABSTRACT

Provided is a spherical aluminum nitride powder having a particle shape that is closer to sphericity. The spherical aluminum nitride powder according to the present invention, which contains a main component comprising AlN and a side component comprising a rare earth compound, is characterized in that at least 70% of particles in the powder have an outer peripheral shape having neither an angular edge part nor an uneven part in the plane projection image of individual particles.

6 Claims, 8 Drawing Sheets

(56) References Cited

FOREIGN PATENT DOCUMENTS

| | | | |
|---|---|---|---|
| JP | H05-221618 A | | 8/1993 |
| JP | H07215707 A | | 8/1995 |
| JP | 2000-044342 A | | 2/2000 |
| JP | 2002-179413 A | | 6/2002 |
| JP | 2003-267708 A | | 9/2003 |
| JP | 2004-224618 A | | 8/2004 |
| JP | 2006-206393 A | | 8/2006 |
| JP | 2012-056774 A | | 3/2012 |
| JP | 2013-151399 A | | 8/2013 |
| JP | 2017-178751 A | | 10/2017 |
| JP | 2019-019045 A | | 2/2019 |
| WO | WO2019031697 | * | 8/2011 |
| WO | 2012/043574 A1 | | 4/2012 |
| WO | 2012/077551 A1 | | 6/2012 |
| WO | 2013/145961 A1 | | 12/2015 |
| WO | 2014/126141 A1 | | 2/2017 |

OTHER PUBLICATIONS

Ohashi. English machine translation of JP391155482. retrieved from: https://patents.google.com/patent/JP3911554B2/en?oq=JP2002-179413 on Jul. 12, 2021 (Year: 2000).*
International Search Report (ISR) of PCT/JP2019/030687 dated Sep. 10, 2019 (5 pages including Japanese version and English translation).
Written Opinion for PCT/JP2019/030687 mailed Sep. 10, 2019 (9 pages including Japanese version and English translation).

* cited by examiner

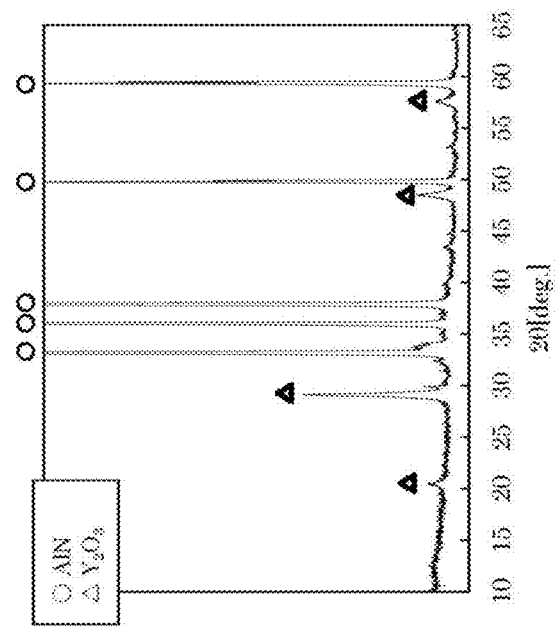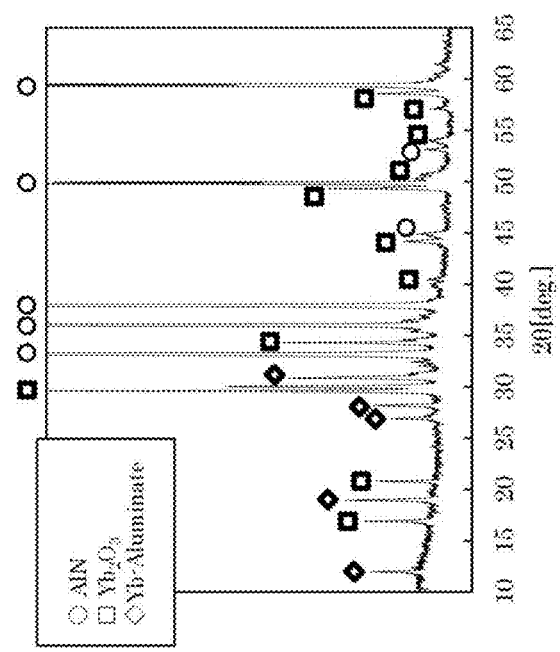
FIG. 8(a)
FIG. 8(b)

SPHERICAL ALUMINUM NITRIDE POWDER AND METHOD FOR PRODUCING SPHERICAL ALUMINUM NITRIDE POWDER

TECHNICAL FIELD

The present invention relates to a spherical aluminum nitride powder and a method for producing the same.

BACKGROUND ART

In recent years, aluminum nitride is known as a ceramic material with excellent thermal conductivity, and sintered substrates thereof are widely used in electronic devices etc. that require high thermal dissipation performance. In addition, aluminum nitride powder is also used as a filler to be mixed into materials such as grease, adhesive, and paint, to take advantage of its excellent thermal conductivity. Desired material properties of fillers include, for example, filling properties, kneading properties, and thermal conductivity. With better filling properties of the filler, powder can be mixed into a material such as a resin, etc. at a higher concentration. With better kneading properties of the filler, the filler can more easily be mixed with the material at a higher concentration. The better the thermal conductivity of the filler, the higher the thermal dissipation performance of the filler-containing material. In other words, improving these material properties of the filler allows for a filler-containing material with higher thermal dissipation performance to be obtained. To that end, various efforts to improve the material properties of fillers have been made.

For example, Patent Document 1 discloses an aluminum nitride powder and method for producing the same, where particles are made spherical for the purpose of improving flowability and filling properties when mixing the powder into a resin. In Patent Document 1, an amorphous aluminum nitride powder synthesized by a direct nitriding method and an alumina reduction nitriding method is aged in a flux to make the particles spherical. In this case, the amorphous aluminum nitride powder is mixed with a flux consisting of precursors of oxides or nitrides of alkaline earth elements, rare earth elements, aluminum, yttrium, lithium or carbonates, nitrates, oxalates, hydroxides, halides, alkoxides, or the like capable of forming the substances mentioned above by decomposition during heating (carbonates, nitrates, oxalates, hydroxides, halides, alkoxides, etc.). Next, an aggregate obtained by heat-treating the mixture at 1,600 to 2,000° C. in an atmosphere of nitrogen or argon is crushed, and then, while stirring in a suitable acid solution of hydrochloric acid, nitric acid, or the like, the flux portion is melted and spherical aluminum nitride particles with smooth surfaces are isolated to obtain the spherical aluminum nitride powder. Spherical aluminum nitride obtained in this way has, for example, an average particle size of 0.1 to 100 microns, and, as seen in the unclear images of FIGS. 2 and 3 of Patent Document 1, has a spherical shape with an apparently smooth surface. However, when employing a flux method, there was a problem in that when removing the flux with a strong acid, the particle surfaces were damaged, increasing the surface area of the particles, and in that since the particle size distribution of the particles could not be controlled, the kneading and filling properties drastically decreased. The spherical aluminum powder of Patent Document 1 has been recreated by the inventors as Comparative Examples 6 to 13, and the properties thereof are shown in Table 3, Table 4, FIG. 6, and FIG. 7 below.

By contrast, Patent Document 2 discloses a filler aluminum nitride powder and method for producing the same, where there are few particles with a particle size of 1 μm or less, with the aim of improving filling and kneading properties without using a flux method. In Patent Document 2, a mixture of alumina with an average particle size of 1 to 3 μm, carbon, and 0.05 to 0.5 wt % of $CaF_2$ relative to the alumina is reduction-nitrided under a reduction atmosphere at 1,500 to 1,700° C., whereby particle size distribution becomes sharper than the alumina, and an aluminum nitride power exhibiting high filling property when mixed with a resin can be obtained.

CITATION LIST

Patent Documents

Patent Document 1: Japanese Unexamined Patent Publication No. 2002-179413
Patent Document 2: Japanese Unexamined Patent Publication No. 2017-114706

SUMMARY OF THE INVENTION

Technical Problem

In Patent Document 2, filling and kneading properties were improved by not using a flux method, and by reducing the ratio of particles with a size of 1 μm or less. However, judging by the SEM images of the aluminum nitride powder, most of the particles have irregularities or protruding angles in their surfaces. In theory, it is understood that the closer the particle shape is to a perfect sphere, the better the filling and kneading properties. Therefore, the inventors of the present invention, in order to further improve the filling and kneading properties and thermal conductivity, set out to obtain a spherical aluminum nitride powder with a particle shape closer to a perfect sphere, without using a flux method.

The present invention was made in order to solve the above problems, and an object thereof is to provide a spherical aluminum nitride powder having a particle shape closer to a perfect sphere and a method for producing the same.

Means for Solving the Problem

A spherical aluminum nitride powder according to an embodiment of the present invention contains a main component consisting of AlN, and a subcomponent consisting of a rare earth compound, wherein 70% or more of particles in the powder have a planar projection shape of each particle in which an outer peripheral shape does not include any protruding angular portions or irregularities.

A spherical aluminum nitride powder according to an embodiment of the present invention is produced without employing a flux method in the production process, and thus contains a certain amount of a rare earth compound. Further, since 70% or more of the particles in the powder do not have protruding angular portions or irregularities in their surfaces, the particle shape could be made closer to a perfect sphere than in the conventional art. In other words, the spherical aluminum nitride powder according to the present invention has improved filling properties, kneading properties, and thermal conductivity as a filler.

In a further embodiment of the present invention, in the planar projection shape of each particle, the outer peripheral shape of the particle consists of a combination of arcuate portions that change gradually, and has no discontinuous points. In other words, in the planar projection shape of each particle, the outer peripheral shape of the particle consists only of a combination of arcuate portions, and thus has no straight line portions. In addition, since the outer peripheries of the particles change gradually and have no discontinuous points, no angular portions or irregularities appear in the seams of the arcuate portions in the outer peripheries of the particles. The term "discontinuous point" refers to a point where the orientation of tangents varies drastically or in a non-continuous manner due to the presence of, for example, angular portions or irregularities In a further embodiment of the present invention, the average particle size is 2 to 30 μm. More preferably, the average particle size is 2.8 to 7.7 μm. In other words, the spherical aluminum nitride powder has an average particle size more suited for a filler.

In a further embodiment of the present invention, 95% or more particles of all the powder have a sphericity of 0.7 or more. In addition, 80% or more particles of all the powder have a sphericity of 0.8 or more. In other words, comparatively many of the particles in the spherical aluminum nitride powder according to the present invention as a whole have at least a certain sphericity, with few particles having a distorted shape, and little variance in particle shape. As a result, the filling properties and kneading properties as a filler are improved.

In a further embodiment of the present invention, the powder contains 1 to 10 wt % of a rare earth compound on an oxide basis relative to 100 wt % of AlN, the rare earth compound being selected from at least one type of a group consisting of an oxide or aluminate compound of Y, Yb, La, Nd, or Sm. In other words, the spherical aluminum nitride powder according to the present invention may have certain additional properties according to the added rare earth compound.

A method of producing a spherical aluminum nitride powder according to an embodiment of the present invention includes:

a step of mixing 100 wt % of an aluminum nitride raw material powder with a first auxiliary agent powder consisting of 1 to 10 wt % of a rare earth compound on an oxide basis, a second auxiliary agent powder consisting of 2 to 8 wt % of a calcium compound on an oxide basis, and 8 to 30 wt % of a carbon powder to obtain a raw material powder mixture;

a step of heat-treating the raw material powder mixture in a first temperature range for a predetermined time under a non-oxidizing atmosphere to promote spheronization and particle growth of particles to obtain a spheronized powder; and a step of heat-treating the spheronized powder in a second temperature range in an oxidizing atmosphere to decarbonize the spheronized powder.

According to the production method of the spherical aluminum nitride powder according to an embodiment of the present invention, the aluminum nitride raw material powder is heat-treated together with the carbon powder, the first auxiliary agent powder consisting of the rare earth compound, and the second auxiliary agent powder consisting of the calcium compound, which makes it possible to remove oxygen from the raw material powder mixture and effectively promote spheronization and particle growth of the aluminum nitride powder from a low temperature range to a high temperature range. As a result, it is possible to obtain a spheronized powder having an outer peripheral shape that does not include any protruding angular portions or irregularities in a planar projection shape, which did not exist in the conventional art. Then, through decarbonization, a spherical aluminum nitride powder with a particle shape closer to a perfect sphere can be obtained.

In a further embodiment of the present invention, the rare earth compound is selected from at least one type of a group consisting of an oxide or halide of Y, Yb, La, Nd, or Sm, or a precursor (carbonate, nitrate, oxalate, hydroxide, alkoxide, etc.) capable of forming the substances mentioned above by decomposition during heating, and the calcium compound is selected from at least one type of a group consisting of an oxide or halide of Ca, or a precursor (sulfide, carbonate, nitrate, oxalate, hydroxide, alkoxide, etc.) capable of forming the substances mentioned above by decomposition during heating. In other words, the spherical aluminum nitride powder produced by the production method according to the present invention may have certain additional properties according to the added rare earth compound.

Effects of the Invention

According to the present invention, a spherical aluminum nitride powder is obtained in which at least 70% of the particles of all the powder has a particle shape closer to a perfect sphere.

BRIEF DESCRIPTION OF THE DRAWINGS

FIG. 8 is a graph showing results of XRD analysis of aluminum nitride sintered bodies according to an embodiment of the present invention, where (a) shows Example 1 and (b) shows Example 11.

DETAILED DESCRIPTION

Below, a first embodiment will be described as an example of the present invention. However, the below description is not intended to limit the invention.

A spherical aluminum nitride powder according to an embodiment of the present invention is an aggregate of fine particles containing a main component consisting of AlN (aluminum nitride), and a subcomponent consisting of a rare earth compound. In particular, the spherical aluminum nitride powder contains 1 to 10 wt % of rare earth compound on an oxide basis relative to 100 wt % of AlN. In raw material composition form, the rare earth compound is selected from at least one type of a group consisting of an oxide or halide of Y, Yb, La, Nd, or Sm, or a precursor (carbonate, nitrate, oxalate, hydroxide, alkoxide, etc.) capable of forming the substances mentioned above by decomposition during heating. In addition, the spherical aluminum nitride powder according to the present embodiment is used as a filler to be filled mainly into a resin material or the like. The average particle size of the spherical aluminum nitride powder is preferably 2 to 30 μm, and more preferably 2.8 to 7.7 μm.

Figure 1:
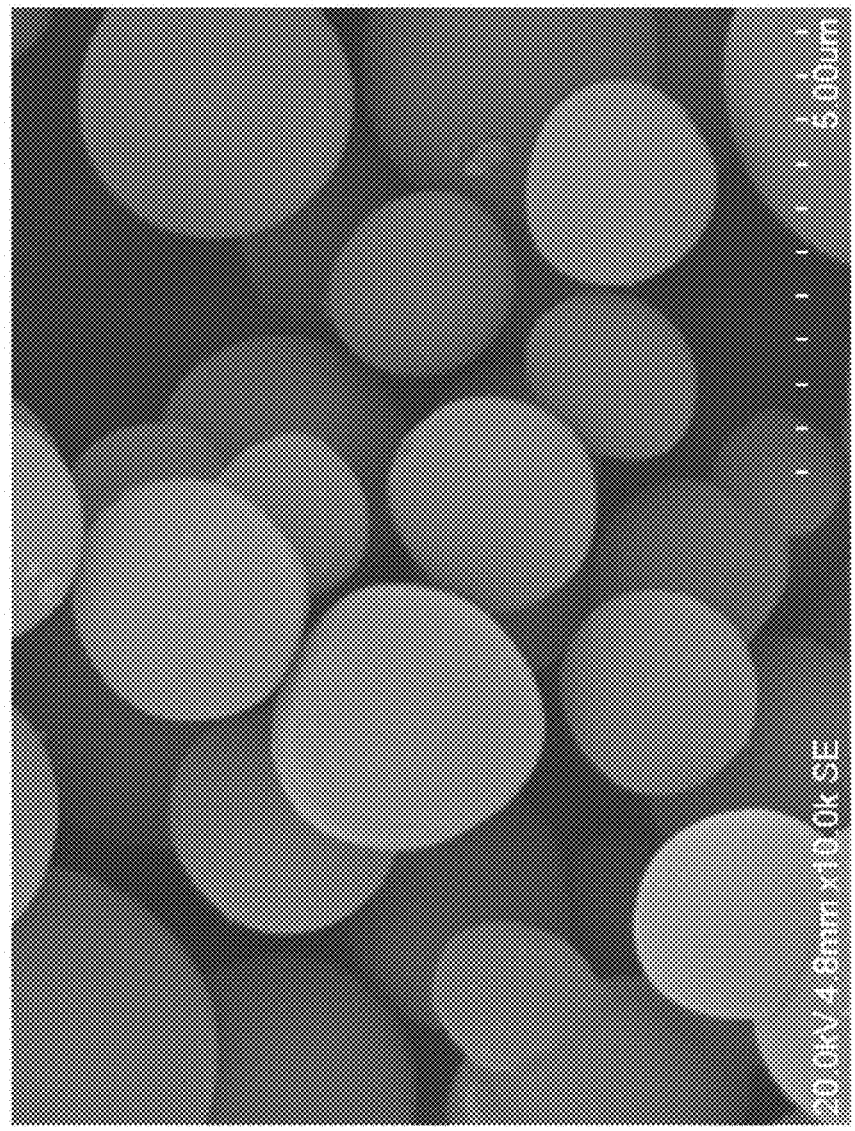
FIG. 1 is a SEM image of a spherical aluminum nitride powder according to an embodiment of the present invention (Example 1).
Figure 2:
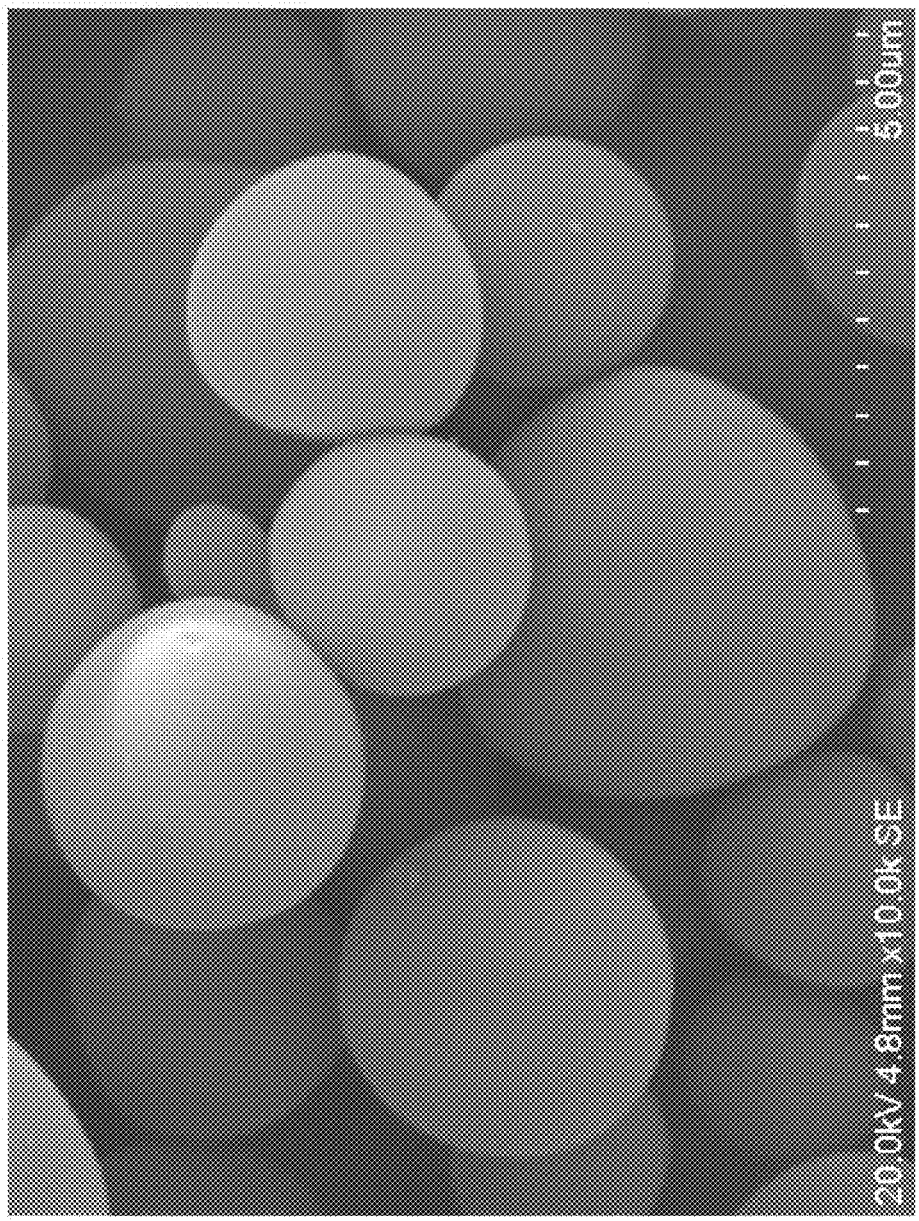
FIG. 2 is a SEM image of a spherical aluminum nitride powder according to an embodiment of the present invention (Example 11).
Figure 3:
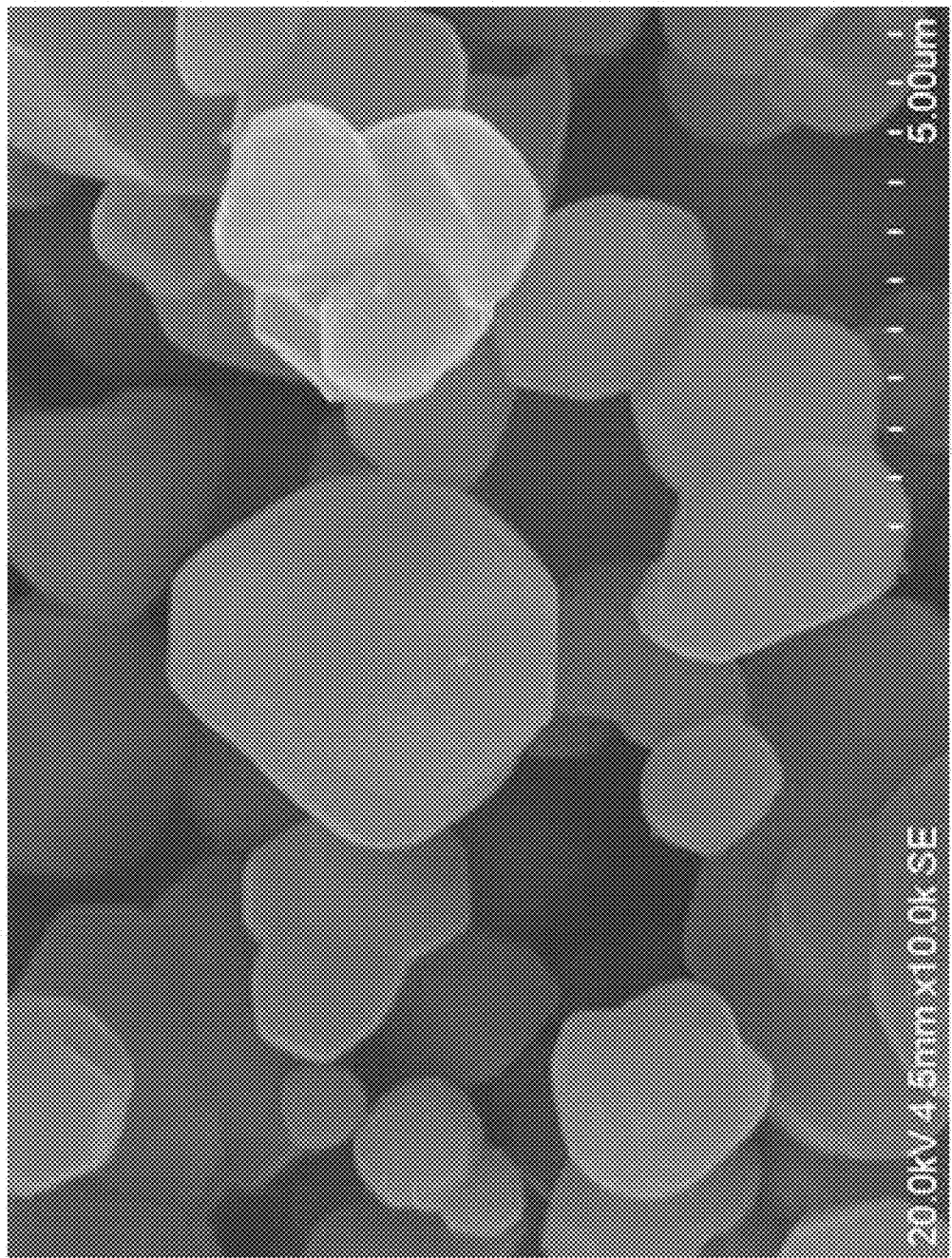
FIG. 3 is a SEM image of a spherical aluminum nitride powder of a conventional example (Patent Document 2).
Figure 4:
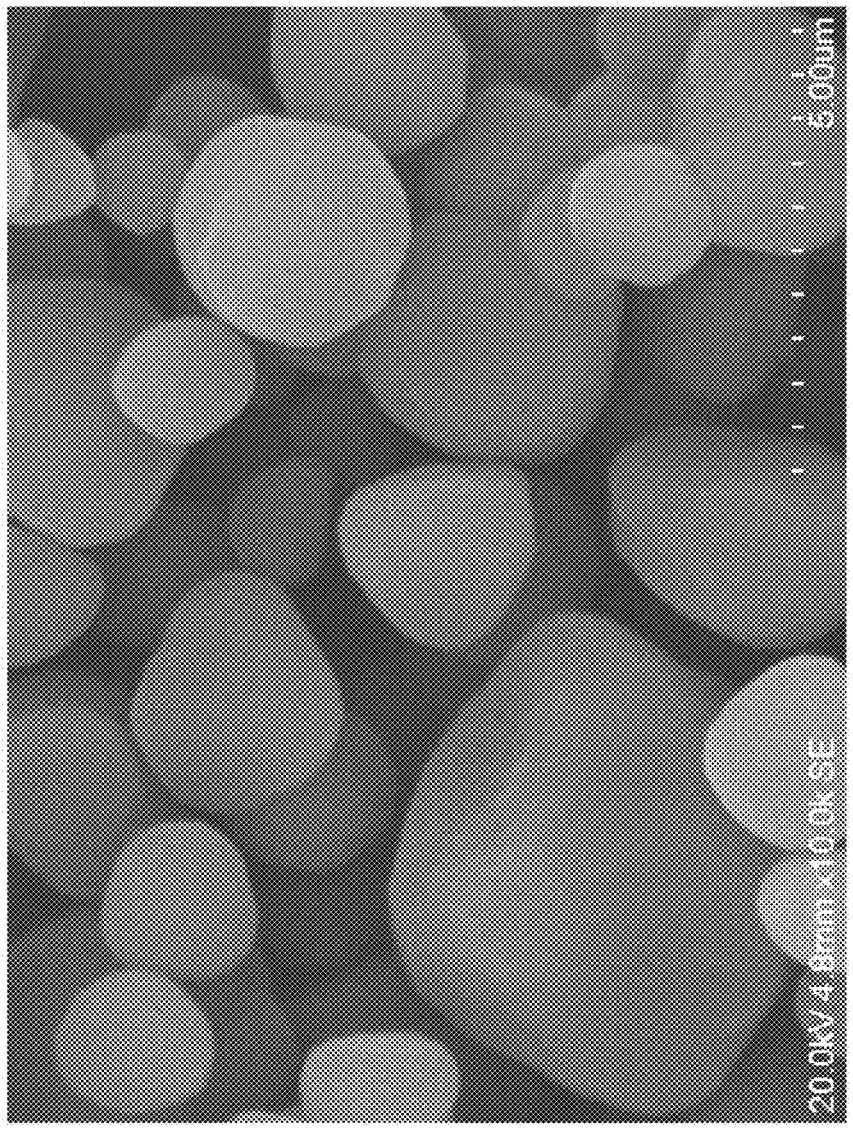
FIG. 4 is a SEM image of a spherical aluminum nitride powder according to a Comparative Example 1 of the present invention.
Figure 5:
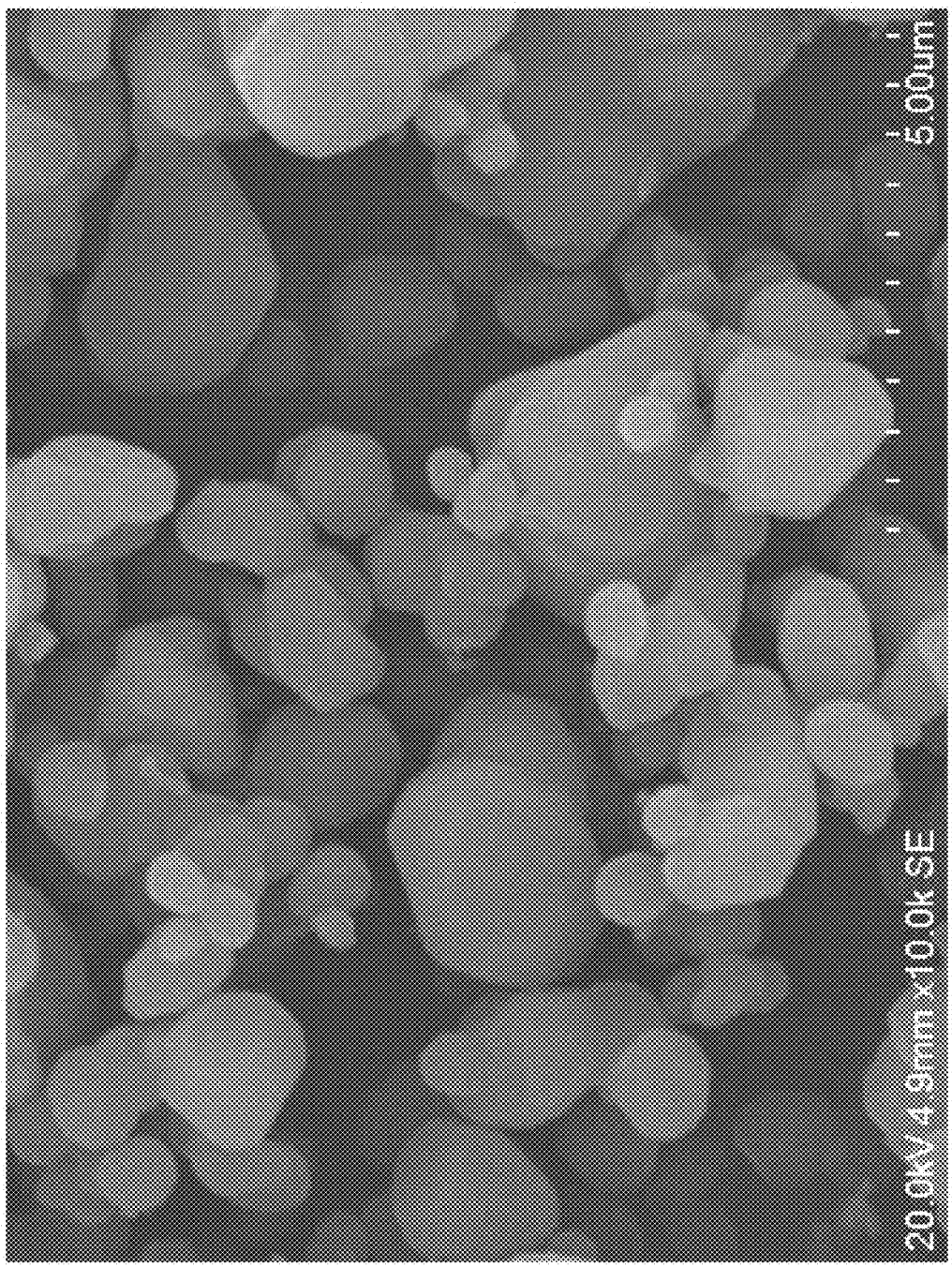
FIG. 5 is a SEM image of a spherical aluminum nitride powder according to a Comparative Example 2 of the present invention.
Figure 6:
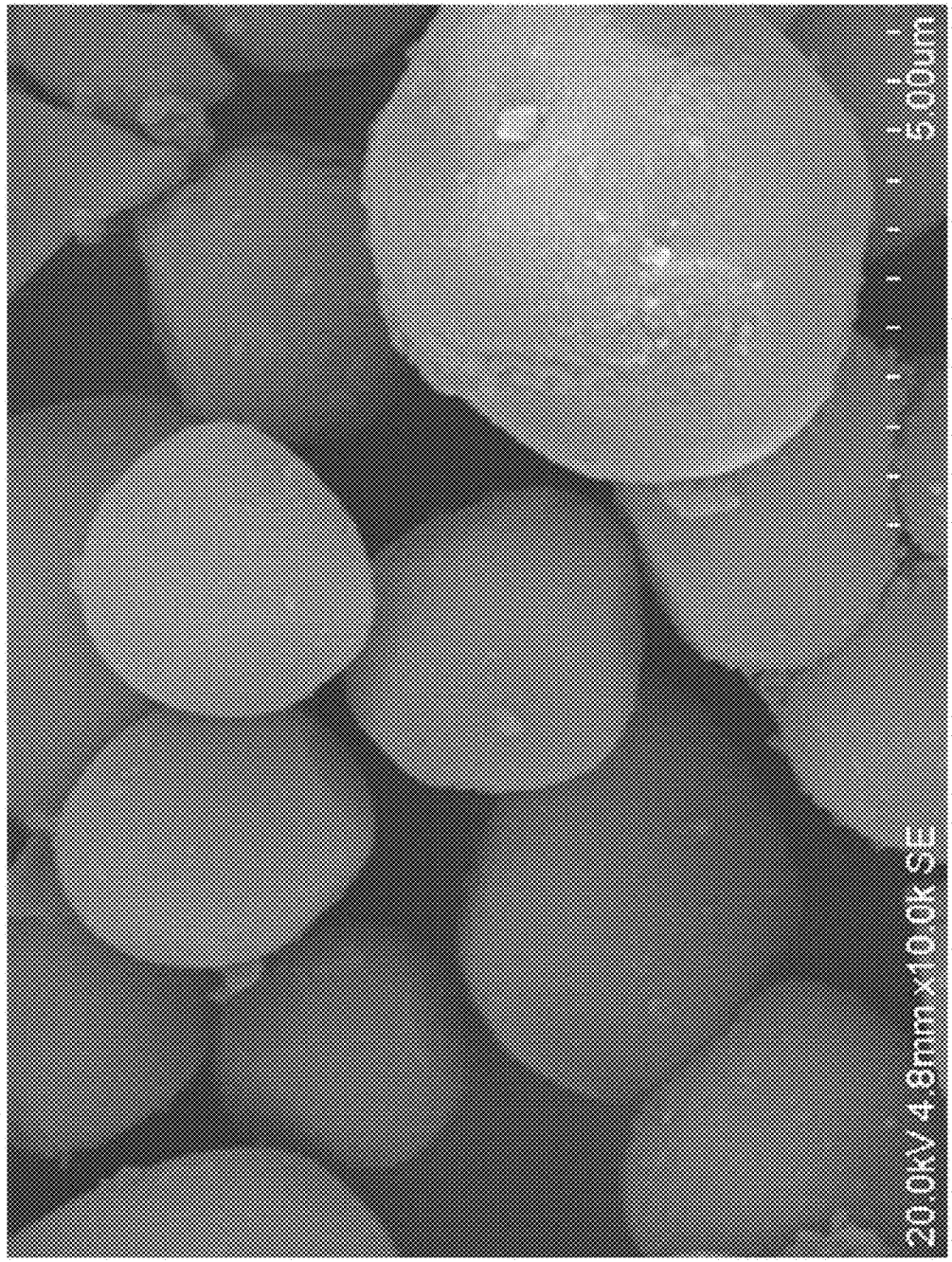
FIG. 6 is a SEM image of a spherical aluminum nitride powder according to a Comparative Example 6 of the present invention.
Figure 7:
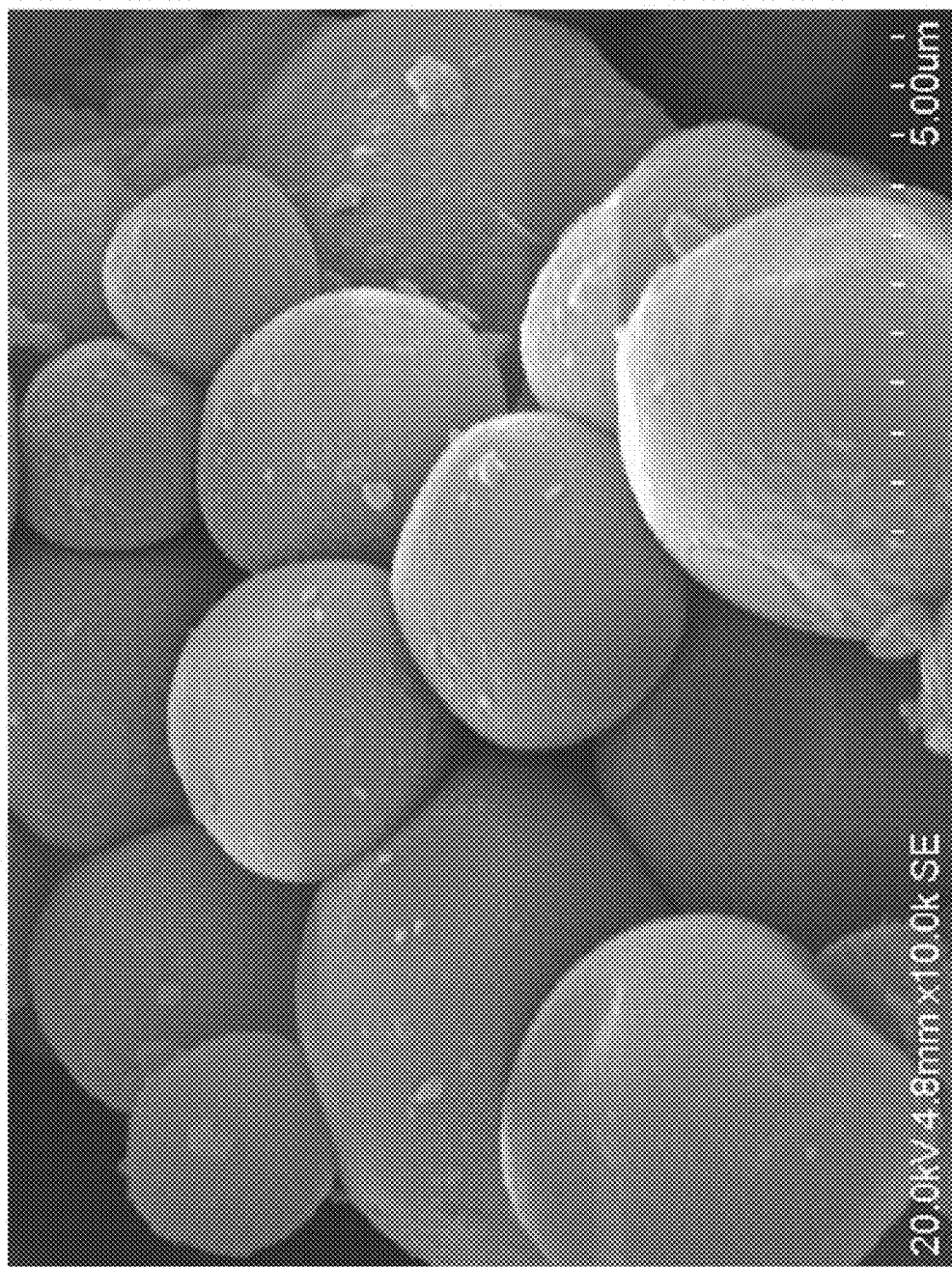
FIG. 7 is a SEM image of a spherical aluminum nitride powder according to a Comparative Example 10 of the present invention.

FIG. 1 and FIG. 2 are typical SEM images of the spherical aluminum nitride powder according to an embodiment of the present invention. Here, FIG. 1 is an exemplary SEM image of a spherical aluminum nitride powder of Example 1 described below, and FIG. 2 is an exemplary SEM image of a spherical aluminum nitride powder of Example 11, but it has been confirmed that the spherical aluminum nitride powder according to the embodiment of the present invention has similar particle shape and geometrical features in the SEM images of other examples as well. Meanwhile, FIG. 3 is a SEM image of a conventional spherical aluminum nitride powder (of Patent Document 2), and FIGS. 4 and 5 are SEM images of spherical aluminum nitride powders of Comparative Examples 1 and 2 described below.

As shown in FIG. 1 and FIG. 2, a majority (at least 70%) of the particles of the spherical aluminum nitride powder according to the present embodiment have a planar projection shape that is a shape close to a circle, with no outwardly protruding angular portions or irregularities. Further, in the planar projection shape of the particles, the outer peripheral shape of the particles include virtually no straight line portions, nor any portions that vary drastically or in a non-continuous manner, and consists of a combination of arcuate portions that form a continuous curve in the entire outer periphery. These arcuate portions define gradually varying curves along the entire periphery, so that it does not have any radically varying seams. In other words, the outer peripheral shape of each particle has no discontinuous points where the orientation of tangents varies drastically or in a non-continuous manner due to the presence of angular portions or irregularities. Further, as seen in FIGS. 1 and 2, the particle surfaces are extremely smooth, from which it can be inferred that the surface areas are small. In other words, the spherical aluminum nitride powder according to the present embodiment exhibits a generally rounded surface shape.

By contrast, as shown in FIGS. 3 to 7, in the planar projection shapes of the SEM images of the spherical aluminum nitride powder according to conventional examples or comparative examples, the outer peripheries of most of the particles include straight line portions, angular portions, and irregularities. In addition, the outer peripheries of most of the particles consist of a combination of straight-line portions and curved line portions, and include discontinuous points in the seams between these portions. In other words, the particles of the spherical aluminum nitride powder according to the conventional and comparative examples can be said to have a generally rounded shape.

According to the SEM images of FIGS. 1 to 7, the spherical aluminum nitride powder according to the present invention can be qualitatively differentiated from conventional spherical aluminum nitride powder in that the particles include no angular portions or irregularities (or discontinuous points) in their planar projection shapes and have generally rounded surfaces. In other words, the majority of the particles in the spherical aluminum nitride powder according to the present invention have a spherical shape with a more curved surface, closer to a perfect sphere.

Further, the spherical aluminum nitride powder according to the present embodiment has an average sphericity of 0.85 or more. Sphericity is a measure of how closely the planar projection shapes of the particles resemble a perfect circle, where the sphericity of a perfect sphere is 1. Sphericity can be obtained by the following formula:

$$4\pi S/L^2$$

Here, S is the area of a particle in planar projection, and L is the perimeter of a particle in planar projection. The sphericity value can be calculated by image analysis of each particle in the SEM image. Further, regarding the ratio of particles with a high sphericity in the spherical aluminum nitride powder according to the present embodiment, 95% or more of all the particles have a sphericity of 0.7 or more, and 80% or more of all the particles have a sphericity of 0.8 or more. In other words, since most of the particles in the spherical aluminum nitride powder according to the present embodiment have a comparatively high sphericity (0.7 or more), the powder as a whole can be said to have little variance in particle shape.

In theory, more particles with a particle shape close to a perfect sphere means that a powder for filler with high filling and kneading properties can be obtained. Therefore, the spherical aluminum nitride powder according to the present embodiment exhibits superior filling and kneading properties as a filler compared to the conventional filler powders consisting of particles with many angular portions and irregularities.

The spherical aluminum nitride powder according to an embodiment of the present invention can be obtained by the production method described below.

The spherical aluminum nitride powder according to the present embodiment is produced through a raw material mixing step of mixing an aluminum nitride raw material powder as a base material with a first auxiliary agent powder consisting of a rare earth compound, a second auxiliary agent powder consisting of a calcium compound, and carbon powder as additives to obtain a raw material powder mixture, a primary heat-treatment (spheronization and particle growth) step of heat-treating the raw material powder mixture in a first temperature range for a predetermined time under a non-oxidizing atmosphere to promote spheronization and particle growth of particles to obtain a spheronized particle powder, and a secondary heat-treatment (decarbonization) step of heat-treating the spheronized particle powder in a second temperature range under an oxidizing atmosphere to decarbonize the spheronized particle powder.

First, in the mixing step, a suitable amount of aluminum nitride raw material powder and suitable amounts of auxiliary agent powder and carbon powder as additives are prepared. The aluminum nitride raw material powder used as the base material is preferably a highly pure powder with few metallic impurities and low oxygen content. The aluminum nitride raw material powder may be synthesized by any method, such as a reduction nitriding method, a direct nitriding method, etc. A powder with an average particle size of 0.8 to 3.0 μm may be used as the aluminum nitride raw material powder. The average particle size of the aluminum nitride raw material powder used as the starting material affects the average particle size of the spherical aluminum nitride powder which is the finished product. In the present embodiment, using aluminum nitride raw material powder with an average particle size of 0.9 to 2.7 μm makes it possible to control the average particle size of the spherical aluminum nitride powder to be 2 to 30 μm. More preferably, the average particle size of the spherical aluminum nitride powder can be controlled to be 2.8 to 7.8 µm.

The rare earth compound constituting the first auxiliary agent powder may be selected from at least one type of a group consisting of an oxide or halide of Y, Yb, La, Nd, or Sm, or a precursor (carbonate, nitrate, oxalate, hydroxide, alkoxide, etc.) capable of forming the substances mentioned above by decomposition during heating. The first auxiliary agent powder is preferably a highly pure powder with few metallic impurities.

The calcium compound constituting the second auxiliary agent powder may be selected from at least one type of a group consisting of an oxide or halide of Ca, or a precursor (sulfide, carbonate, nitrate, oxalate, hydroxide, alkoxide, etc.) capable of forming the substances mentioned above by decomposition during heating, but the use of $CaF_2$ is preferable. Adding $CaF_2$ has the effect of producing $CaF_2$—CaO—$Al_2O_3$, which has a low melting point, further promoting nitriding reaction and particle growth. The average particle size of the calcium compound should be smaller than the average particle size of the intended spherical aluminum nitride powder, and is preferably 0.5 to 2 µm. Using powder with an average particle size bigger than 2 µm may cause coarse particles to be unevenly produced.

Particles mainly consisting of carbon, such as furnace black and acetylene black, may be used as the carbon powder. The carbon to be used preferably has an average particle size of 10 to 50 nm, and an ash content of 0.1% or less.

In the raw material mixing step, 100 wt % of aluminum nitride raw material powder is preferably mixed with 1 to 10 wt % of rare earth compound on an oxide basis, 2 to 8 wt % of calcium compound on an oxide basis, and 8 to 30 wt % of carbon powder. "On an oxide basis" as used here means a value calculated by converting a compound containing a metallic element into an oxide of the metallic element.

By mixing the prepared raw material powders by a common method such as a vibration mill, a ball mill, a V-blender, etc. until they are uniformly mixed, the raw material powder mixture can be obtained.

Next, in the primary heat-treatment step, the raw material powder mixture is heat-treated in a first temperature range for a predetermined time under a non-oxidizing atmosphere (for example, nitrogen, argon, etc.). In the heat-treating, the temperature is increased from room temperature to the first temperature range, and then the heat-treatment temperature is held in the first temperature range for a predetermined holding time to heat the raw material powder mixture. The first temperature range is preferably a temperature range of 1,400 to 1,800° C. Further, the holding time of the first temperature range is preferably one hour or longer.

In this primary heat-treatment step, spheronized particle powder closer to a perfect sphere than conventional powders can be obtained by spheronizing the particles and promoting particle growth. Observations regarding spheronizing and particle growth of the aluminum nitride particles in the primary heat-treatment step are described below. In the primary heat-treatment step, the calcium compound and the rare earth compound together contribute to promoting spheronization and particle growth of aluminum nitride particles. Particularly, when the temperature increases to the first temperature range, the calcium compound produces a liquid phase at the comparatively low temperature of about 1,230° C., which wets the surfaces of the aluminum nitride particles, promoting initial spheronization and particle growth of the particles. Since this calcium compound decomposes easily under a non-oxidizing atmosphere and becomes volatile at high temperatures (for example, at 1,350° C. or higher), hardly any of it remains in high temperature ranges such as the first temperature range in which the aluminum nitride particles grow further. After the first temperature range has been reached and most of the calcium compound is gone, in the high temperature range, the rare earth compound serves to promote spheronization and particle growth of the aluminum nitride particles. As a result, effective spheronization and particle growth is thought to be performed across the entire primary heat-treatment step. In other words, using the calcium compound and the rare earth compound together as auxiliary agents enables effective spheronization and particle growth in two stages; low temperature and high temperature, making it possible to spheronized the aluminum nitride particles even further than in the conventional art. The carbon powder is added in order to prevent the aluminum nitride particles from fusing together with one another. The carbon powder further reacts with oxygen in the raw material powder mixture at a high temperature to reduce the oxygen content, thereby contributing to increasing the thermal conductivity of the aluminum nitride particles.

Next, in the secondary heat-treatment (decarbonization) step, the spheronized particle powder is heat-treated for several hours in a second temperature range of 500 to 800° C. under an oxidizing atmosphere (for example, the standard atmosphere) to burn away the carbon and decarbonize the powder. This removes the carbon component of the spheronized particle powder. The carbon content after decarbonization is ideally equal to before the carbon powder was mixed in (i.e. approximately 0), but it is known that a carbon content of 0.15 wt % or less of the powder as a whole does not affect the properties of the powder. Therefore, decarbonization treatment is performed until the amount of residual carbon becomes 0.15 wt % of the total weight. Conditions such as temperature and treatment time can be freely determined according to the amount of carbon powder added, etc. Measurement of the residual carbon can be done using a known method such as oxygen airflow combustion-infrared absorptiometry, in which a sample is heated in an oxygen flow to cause an oxidation reaction, and generated $CO_2$ and CO is detected by an infrared detector.

A crystal phase of the spherical aluminum nitride powder thus obtained was identified by X-ray diffraction. X-ray diffraction using Cu-Kα rays was used for the crystal phase identification. An UltimaIV apparatus made by Rigaku Corporation was used for the measuring. FIGS. 8 (*a*) and (*b*) show typical X-ray diffraction patterns (corresponding to Examples 1 and 11 described below) of the spherical aluminum nitride powder produced by the production method according to the present embodiment. As exemplarily shown in FIG. 8, of the spherical aluminum nitride powder according to the present embodiment, the diffraction peaks of the AN main component and the rare earth compound subcomponent (Y2O3 in FIG. 8 (*a*), and Yb2O3 and Ytterbium aluminate (Yb-Aluminate) in FIG. 8 (*b*)) can be seen. It has thus been confirmed through X-ray diffraction that the spherical aluminum nitride powder according to the present embodiment was obtained.

EXAMPLES

Below, the present invention is described more specifically based on examples and comparative examples, but the present invention is not to be interpreted as being limited by these examples.

The spherical aluminum nitride powders according to Examples 1 to 21 and Comparative Examples 1 to 5 were produced by carrying out the following steps.

First, a predetermined amount of aluminum nitride raw material powder was prepared. A powder with an average particle size of 0.9 to 2.7 μm was used as the aluminum nitride raw material powder. As auxiliary agent powders, highly pure powders of a rare earth compound and a calcium compound were prepared. As the carbon powder, a powder with an average particle size of 10 to 50 nm and an ash content of 0.1% or less was used. A predetermined percentage by weight of the rare earth compound powder, the calcium compound powder, and the carbon powder were mixed into 100 wt % of the aluminum nitride raw material powder. The mixing ratios of the raw materials differed for each sample, as shown in Table 1. The raw materials were then put in a ball mill and mixed thoroughly to obtain the raw material powder mixture.

Next, the raw material powder mixture was spread out on a graphite tray and put into a heat-treating oven, heated to a first temperature range under a nitrogen atmosphere, and then heat-treated for a predetermined holding time to obtain a spheronized particle powder. The heat-treating temperature (first temperature range) and the holding time differed for each sample, as shown in Table 1.

Next, the spheronized particle powder was heated for three hours at 750° C. under a standard atmosphere to carry out decarbonization. The decarbonization conditions were the same for all samples. Then, the residual carbon in each sample was measured to confirm that the carbon content was less than 0.15 wt %. The carbon content measurement was done through oxygen airflow combustion-infrared absorptiometry using an EMIA-221V made by HORIBA, Ltd. Through the above steps, the spherical aluminum nitride powders according to the Examples and the Comparative Examples were obtained.

The mixing ratios and production conditions of the spherical aluminum nitride powders according to Examples 1 to 21 and Comparative Examples 1 to 5 are shown in Table 1 below.

TABLE 1

| | Raw material AlN particle size (μm) | Added amount of carbon (wt %) | Calcium compound Type | Calcium compound Added amount on oxide basis (wt %) | Rare earth compound Type | Rare earth compound Added amount on oxide basis (wt %) | Heat Treatment temperature (° C.) | Holding time (hr) |
|---|---|---|---|---|---|---|---|---|
| Example 1 | 2.3 | 8.5 | $CaF_2$ | 4 | $Y_2O_3$ | 5 | 1700 | 5 |
| Example 2 | 2.3 | 8.5 | $CaF_2$ | 4 | $Y_2O_3$ | 5 | 1600 | 20 |
| Example 3 | 2.3 | 8.5 | $CaF_2$ | 4 | $Y_2O_3$ | 5 | 1500 | 20 |
| Example 4 | 2.3 | 8.5 | $CaF_2$ | 4 | $Y_2O_3$ | 5 | 1800 | 5 |
| Example 5 | 2.3 | 8.5 | $CaF_2$ | 4 | $Y_2O_3$ | 5 | 1700 | 48 |
| Example 6 | 2.3 | 8.5 | $CaF_2$ | 4 | $Y_2O_3$ | 1 | 1700 | 20 |
| Example 7 | 2.3 | 8.5 | $CaF_2$ | 2 | $Y_2O_3$ | 3 | 1700 | 20 |
| Example 8 | 2.3 | 8.5 | $CaF_2$ | 8 | $Y_2O_3$ | 10 | 1700 | 5 |
| Example 9 | 2.3 | 30 | $CaF_2$ | 4 | $Y_2O_3$ | 5 | 1700 | 1 |
| Example 10 | 2.3 | 8 | $CaF_2$ | 4 | $YF_3$ | 5 | 1760 | 1 |
| Example 11 | 2.3 | 8 | $CaF_2$ | 4 | $Yb_2O_3$ | 8 | 1760 | 1 |
| Example 12 | 2.3 | 8 | $CaF_2$ | 4 | $La_2O_3$ | 7 | 1760 | 1 |
| Example 13 | 2.3 | 8 | $CaF_2$ | 4 | $Nd_2O_3$ | 7 | 1760 | 1 |
| Example 14 | 2.3 | 8 | $CaF_2$ | 4 | $Sm_2O_3$ | 7 | 1700 | 5 |
| Example 15 | 2.3 | 8 | $CaCO_3$ | 3 | $Y_2O_3$ | 5 | 1700 | 5 |
| Example 16 | 2.3 | 8 | $CaCO_3$ | 3 | $YF_3$ | 5 | 1760 | 1 |
| Example 17 | 1.5 | 30 | $CaF_2$ | 4 | $Y_2O_3$ | 5 | 1700 | 48 |
| Example 18 | 0.9 | 8.5 | $CaF_2$ | 4 | $Y_2O_3$ | 5 | 1700 | 20 |
| Example 19 | 2.7 | 8.5 | $CaF_2$ | 4 | $Y_2O_3$ | 5 | 1700 | 20 |
| Example 20 | 2.3 | 8.5 | $CaCl_2$ | 4 | $Y_2O_3$ | 5 | 1700 | 20 |
| Example 21 | 2.3 | 8.5 | $CaSO_4$ | 4 | $Y_2O_3$ | 5 | 1700 | 20 |
| Comp. Ex. 1 | 2.3 | 30 | $CaF_2$ | 7 | — | | 1700 | 20 |
| Comp. Ex. 2 | 2.3 | 30 | — | | $Y_2O_3$ | 10 | 1700 | 20 |
| Comp. Ex. 3 | 2.3 | 3 | $CaF_2$ | 4 | $Y_2O_3$ | 5 | 1700 | 5 |
| Comp. Ex. 4 | 2.3 | 8.5 | $CaF_2$ | 4 | $Y_2O_3$ | 5 | 1850 | 1 |
| Comp. Ex. 5 | 2.3 | 8.5 | $CaF_2$ | 4 | $Y_2O_3$ | 5 | 1300 | 20 |

Further, in order to compare the properties of the spherical aluminum nitride powder according to the Examples of the present invention with those of aluminum nitride powder produced by a flux method, the aluminum nitride powders of Comparative Examples 6 to 13 were produced using the production method described in Patent Document 1 (Japanese Unexamined Patent Publication No. 2002-179413). The production method is described below. First, calcium carbonate and optionally yttrium aluminate was mixed into an aluminum nitride raw material powder at a predetermined molar ratio, and then the raw material powder was heat-treated for 2 to 12 hours at 1,800° C. under a nitrogen atmosphere to produce an aggregate of aluminum nitride powder containing flux. Next, the aggregate of aluminum nitride powder containing flux was crushed. The aluminum nitride powder containing flux was stirred for a predetermined time in a (1+1) hydrochloric acid solution. In Comparative Examples 6 to 12, stirring was carried out for about 6 hours the flux portion melted completely. In Comparative Example 13, stirring was carried out for about 1 hour so that the subcomponent remained.

The mixing ratios and production conditions of the aluminum nitride powders of Comparative Examples 6 to 13 are shown in Table 2 below.

TABLE 2

| | | Raw material | | | | Heat-treatment conditions | | | Stirring conditions |
|---|---|---|---|---|---|---|---|---|---|
| | | Primary particle | Mixing ratios | | | | Temperature | Time | Time |
| | Production method | size μm | AlN mol | CaCO$_3$ mol | Y$_2$O$_3$ mol | Atmosphere | ° C. | Hr | Hr |
| Comp. Ex. 6 | Reduction nitriding | 0.5 | 80 | 20 | 0 | N$_2$ | 1800 | 6 | 6 |
| Comp. Ex. 7 | Direct nitriding | 2 | 80 | 20 | 0 | | | 12 | 6 |
| Comp. Ex. 8 | | 7 | 80 | 20 | 0 | | | 12 | 6 |
| Comp. Ex. 9 | | 13 | 80 | 20 | 0 | | | 12 | 6 |
| Comp. Ex. 10 | Reduction nitriding | 0.5 | 80 | 10 | 10 | | | 6 | 6 |
| Comp. Ex. 11 | | 0.5 | 80 | 20 | 10 | | | 6 | 6 |
| Comp. Ex. 12 | | 0.5 | 80 | 0 | 20 | | | 6 | 6 |
| Comp. Ex. 13 | | 0.5 | 80 | 10 | 10 | | | 6 | 1 |

The properties of the spherical aluminum nitride powders according to Examples 1 to 21 and Comparative Examples 1 to 13 were evaluated using the following method.

A. The crystal phase of the spherical aluminum nitride powder of each sample was analyzed by X-ray diffraction. X-ray diffraction using Cu-Kα rays was used for the analysis. An UltimaIV apparatus made by Rigaku Corporation was used for the measuring.

B. The average particle size of the spherical aluminum nitride powder of each sample was measured using a laser diffraction method. A SALD-2200 laser diffraction particle size analyzer made by Shimadzu Corporation was used for the measuring.

C. The specific surface area of the spherical aluminum nitride powder of each sample was measured using a single-point BET method, which is a nitrogen gas adsorption method. A Monosorb MS-21 made by Quantachrome was used for the measuring.

D. A SEM image for analysis of the spherical aluminum nitride powder of each sample was obtained and analysis of the particle shapes was carried out. Specifically, a mixture of an epoxy resin (Epotote YH-300 made by NIPPON STEEL Chemical & Material Co., Ltd.), a curing agent (HN-2200 made by Hitachi Chemical Co. Ltd.), and the produced spherical aluminum nitride powder was inserted into a silicone mold and thermally cured to obtain a molded body. Next, the molded body was polished, and an image of the polished surface was captured with a scanning electron microscope (S-3400N made by Hitachi High-Tech Corporation) at a magnification rate of 2,000. Using the image processing software "Image" on the obtained SEM image, image analysis of any 100 or more particles was carried out. Here, the samples were evaluated based on the average sphericity, sphericity ratio, average aspect ratio, and SEM image observation results. The average sphericity was calculated by obtaining the sphericities of all of the 100 or more particles using the formula described above and then obtaining the average value thereof. The sphericity ratio is the percentage of all the analyzed particles made up by the number of particles that have a sphericity of a predetermined value (0.85, 0.8, 0.7) or more. The average aspect ratio was calculated by obtaining the aspect ratios of all of the 100 or more particles and then obtaining the average value thereof. The aspect ratio of each particle is calculated by performing an ellipse approximation of the particles using the image processing software "ImageJ" on the SEM image, finding the minor axis (DS) and the major axis (DL) of the ellipsis, and dividing DS by DL. Regarding the SEM image observation results, the presence of angular portions and irregularities in the outer peripheries of the particles in the obtained SEM images (e.g. FIGS. 1, 2, 4, 5, 6, and 7) were visually confirmed, and samples in which at least 70% or more of the particles did not have angular portions or irregularities in their outer peripheries were evaluated as "Good", and samples which did not meet these criteria were evaluated as "Poor". An angular portion is a location in the SEM image where a curved shape is not continuous (discontinuous point). An irregularity is a location in the SEM image that is clearly recessed or projected from the sphere surface.

The properties of the spherical aluminum powders according to the Examples and Comparative Examples are shown in Tables 3 and 4 below.

Table 3 below shows the rare earth compound subcomponent, other than the AlN component, of each sample, detected by X-ray diffraction.

TABLE 3

| | Rare earth subcomponent detected by X-ray diffraction | | |
|---|---|---|---|
| Example 1 | Y$_2$O$_3$ | | |
| Example 2 | YAL | CaYAl$_3$O$_7$ | |
| Example 3 | YAG | YOF | |
| Example 4 | Y$_2$O$_3$ | | |
| Example 5 | Y$_2$O$_3$ | | |
| Example 6 | Y$_2$O$_3$ | YAM | |
| Example 7 | Y$_2$O$_3$ | YAM | YOF |
| Example 8 | Y$_2$O$_3$ | | |
| Example 9 | Y$_2$O$_3$ | | |
| Example 10 | YAL | YAM | |
| Example 11 | Yb$_2$O$_3$ | Yb-Aluminate | |
| Example 12 | La$_2$O$_3$ | | |
| Example 13 | Nd-Aluminate | | |
| Example 14 | Sm-Aluminate | | |
| Example 15 | YAG | | |
| Example 16 | YAL | YAM | |
| Example 17 | Y$_2$O$_3$ | | |
| Example 18 | Y$_2$O$_3$ | | |
| Example 19 | Y$_2$O$_3$ | | |
| Example 20 | Y$_2$O$_3$ | | |
| Example 21 | Y$_2$O$_3$ | | |
| Comp. Ex. 1 | | Not detected | |
| Comp. Ex. 2 | Y$_2$O$_3$ | YAM | |
| Comp. Ex. 3 | | Unmeasured | |
| Comp. Ex. 4 | Y$_2$O$_3$ | | |
| Comp. Ex. 5 | YAG | YOF | |
| Comp. Ex. 6 | Not detected | | |
| Comp. Ex. 7 | Not detected | | |
| Comp. Ex. 8 | Not detected | | |
| Comp. Ex. 9 | Not detected | | |

TABLE 3-continued

| | Rare earth subcomponent detected by X-ray diffraction | |
|---|---|---|
| Comp. Ex. 10 | Not detected | |
| Comp. Ex. 11 | Not detected | |
| Comp. Ex. 12 | Not detected | |
| Comp. Ex. 13 | $Y_2O_3$ | Y-Aluminate |

According to Table 3, it was confirmed that the spherical aluminum nitride powders according to Examples 1 to 21 contains a rare earth compound subcomponent in some form. Depending on the Example, the rare earth compound may be detected in the aluminum nitride powder in several forms. On the other hand, in the Comparative Examples 1, 6, 7, 8, and 9, where no rare earth compound is added, only the diffraction peak of the AlN is detected, and no diffraction peaks of other crystal phases were confirmed. Further, in Comparative Examples 10 to 12 which were produced by a flux method adding the rare earth compound, no rare earth compound subcomponent was detected. It is plausible that the subcomponent was lost in the process of removing the flux with a strong acid. Meanwhile, in Comparative Example 13, in which the immersion time in the strong acid was short, it can be seen that the rare earth compound subcomponent remains.

Table 4 below shows the average particle size, specific surface area, average sphericity, sphericity ratio, average aspect ratio, and SEM image observation results of each sample.

According to Table 4, in Examples 1 to 21 and Comparative Examples 1, 2, 4, and 5, the spherical aluminum nitride powder has an average particle size of 2.8 to 7.7 μm, a specific surface area of 0.3 to 1.1 $m^2/g$, and an average aspect ratio of 0.74 to 0.84. No significant differences were found between the Examples and the Comparative Examples in terms of these properties. The specific surface area indicates the surface area per unit weight of the powder, and affects kneading and filling properties. In Comparative Example 3, agglutination of the particles made it impossible to obtain any of the parameters. According to Comparative Example 3 it was discovered that when the added content of carbon powder becomes 3 wt % or less, agglutination of particles may occur. Meanwhile, in Comparative Examples 6 to 13, the aluminum nitride powder has an average particle size of 4.0 to 8.2 μm, a specific surface area of 1.7 to 3.2 $m^2/g$, and an average aspect ratio of 0.70 to 0.79. These results indicate that aluminum nitride powder produced by a flux method has a significantly larger specific surface area compared to the Examples. It is known that a large specific surface area has a negative impact on the kneading and filling properties of the particles. It can be inferred that the particle surfaces became roughened in the process of removing the flux with a strong acid, regardless of the immersion time in the strong acid. In other words, the spherical aluminum nitride powder according to the present invention is differentiated from samples produced by a flux method in that it has a specific surface area of 1.6 $m^2/g$ or less.

According to the results of the image analysis of the SEM images, while Examples 1 to 21 have an average sphericity

TABLE 4

| | Average particle size (μm) | Specific surface area ($m^2/g$) | Average sphericity | Sphericity ratio 0.85 or more (%) | 0.8 or more (%) | 0.7 or more (%) | Average aspect ratio | SEM image observation results |
|---|---|---|---|---|---|---|---|---|
| Example 1 | 4.73 | 0.56 | 0.87 | 73.2% | 86.3% | 95.4% | 0.82 | Good |
| Example 2 | 3.90 | 0.85 | 0.87 | 66.1% | 86.2% | 100.0% | 0.77 | Good |
| Example 3 | 3.23 | 0.98 | 0.88 | 71.9% | 85.8% | 98.5% | 0.79 | Good |
| Example 4 | 4.52 | 0.95 | 0.88 | 69.7% | 85.1% | 99.0% | 0.78 | Good |
| Example 5 | 5.62 | 0.48 | 0.86 | 65.0% | 85.0% | 96.9% | 0.82 | Good |
| Example 6 | 4.90 | 0.62 | 0.87 | 64.6% | 86.9% | 100.0% | 0.80 | Good |
| Example 7 | 4.48 | 0.62 | 0.88 | 75.2% | 88.2% | 98.5% | 0.81 | Good |
| Example 8 | 5.01 | 0.60 | 0.88 | 71.8% | 87.4% | 99.2% | 0.84 | Good |
| Example 9 | 5.76 | 0.63 | 0.86 | 60.9% | 86.5% | 100.0% | 0.82 | Good |
| Example 10 | 5.11 | 0.78 | 0.87 | 65.5% | 85.5% | 100.0% | 0.81 | Good |
| Example 11 | 6.22 | 0.60 | 0.87 | 54.6% | 87.1% | 100.0% | 0.76 | Good |
| Example 12 | 4.60 | 0.84 | 0.85 | 52.2% | 85.1% | 98.4% | 0.75 | Good |
| Example 13 | 5.16 | 0.85 | 0.86 | 62.6% | 85.0% | 98.0% | 0.77 | Good |
| Example 14 | 6.53 | 0.45 | 0.88 | 75.2% | 91.6% | 97.9% | 0.80 | Good |
| Example 15 | 4.12 | 0.95 | 0.87 | 64.0% | 84.1% | 98.1% | 0.77 | Good |
| Example 16 | 5.39 | 0.71 | 0.86 | 63.6% | 84.1% | 95.3% | 0.77 | Good |
| Example 17 | 6.90 | 0.48 | 0.86 | 65.6% | 87.2% | 98.4% | 0.81 | Good |
| Example 18 | 7.01 | 0.46 | 0.87 | 74.1% | 85.2% | 97.9% | 0.82 | Good |
| Example 19 | 7.31 | 0.39 | 0.87 | 69.5% | 81.4% | 95.5% | 0.81 | Good |
| Example 20 | 6.91 | 0.40 | 0.87 | 69.1% | 80.6% | 98.2% | 0.80 | Good |
| Example 21 | 7.63 | 0.39 | 0.88 | 77.9% | 91.3% | 97.7% | 0.82 | Good |
| Comp. Ex. 1 | 4.27 | 0.62 | 0.85 | 60.5% | 76.4% | 92.7% | 0.78 | Poor |
| Comp. Ex. 2 | 3.43 | 1.08 | 0.82 | 45.8% | 65.1% | 89.1% | 0.74 | Poor |
| Comp. Ex. 3 | Agglutination made evaluation impossible | | | | | | | |
| Comp. Ex. 4 | 6.62 | 0.67 | 0.84 | 59.3% | 72.0% | 93.7% | 0.78 | Poor |
| Comp. Ex. 5 | 2.82 | | 0.79 | 55.8% | 61.1% | 85.3% | 0.76 | |
| Comp. Ex. 6 | 4.08 | 1.76 | 0.78 | 21.7% | 47.0% | 78.7% | 0.74 | Poor |
| Comp. Ex. 7 | 5.33 | 2.40 | 0.76 | 24.0% | 38.4% | 70.8% | 0.73 | Poor |
| Comp. Ex. 8 | 5.34 | 2.28 | — | — | — | — | — | Poor |
| Comp. Ex. 9 | 5.30 | 2.26 | — | — | — | — | — | Poor |
| Comp. Ex. 10 | 6.92 | 2.85 | 0.77 | 20.4% | 37.6% | 73.1% | 0.73 | Poor |
| Comp. Ex. 11 | 6.31 | 2.77 | 0.80 | 39.1% | 51.4% | 78.9% | 0.74 | Poor |
| Comp. Ex. 12 | 4.82 | 3.17 | 0.8 | 33.7% | 55.8% | 85.0% | 0.72 | Poor |
| Comp. Ex. 13 | 8.12 | 2.71 | 0.71 | 23.5% | 33.7% | 57.5% | 0.70 | Poor | of 0.85 to 0.88 (in other words, 0.85 or more), the average sphericity in Comparative Examples 1 to 5 is 0.79 to 0.85. It can thus be seen that the particles of Examples 1 to 21 have a slightly higher sphericity than those of Comparative Examples 1, 2, 4, and 5. Looking at the ratio of particles with high sphericity, a significant difference can be found between Examples 1 to 21 and Comparative Examples 1, 2, 4, and 5. Specifically, in Examples 1 to 21, the percentage of particles with a sphericity of 0.7 or more is 95% or more (95 to 100%), whereas in Comparative Examples 1, 2, 4, and 5, the percentage is about 94% or less (85 to 94%). Further, in Examples 1 to 21, the percentage of particles with a sphericity of 0.8 or more is about 80% or more (80 to 92%), whereas in Comparative Examples 1, 2, 4, and 5, the percentage is about 77% or less (61 to 77%). Still further, in Examples 1 to 21, the percentage of particles with a sphericity of 0.85 or more is 52 to 78%, whereas in Comparative Examples 1, 2, 4, and 5, the percentage is 45 to 60%. The reason why it is harder to find a numerical difference in the comparison of Examples 1 to 21 with Comparative Examples 1, 2, 4, and 5 when the sphericity is 0.85 or more is thought to be because the conditions for sphericity are stricter. In Comparative Examples 6 to 13, in which the samples were produced by a flux method, the percentage of particles with a sphericity of 0.7 or more is 85% or less (57 to 85%), the percentage of particles with a sphericity of 0.8 or more is 56% or less (33 to 56%), and the percentage of particles with a sphericity of 0.85 or more is 40% or less (20 to 40%). Thus, since the spherical aluminum powder of Examples 1 to 21 has a significantly greater percentage of particles with a sphericity of 0.7, 0.8 or more compared to the Comparative Examples, the powder as a whole can be said to be an aggregate of particles with a statistically low variance in particle shape, and being closer to a perfect sphere. In particular, it was found that aluminum nitride powder produced by a production method based on a conventional flux method corresponding to Patent Document 1 has an extremely high variance in particle shape regardless of the length of immersion time in strong acid. In other words, it was found that the difference in variance of particle shape is particularly prominent between the spherical aluminum nitride powder of the Examples and the aluminum nitride powder produced by a flux method.

Next, the SEM image observation results will be examined. FIG. 1 and FIG. 2 respectively show SEM images of Examples 1 and 11. Here, the SEM images of Examples 1 and 11 are used representatively, but similar SEM images were confirmed for the other Examples as well. Observing and evaluating the particle shapes of Examples 1 to 21 based on the SEM images, for all samples it was determined that 70% or more of the particles did not have any angular portions or irregularities in their outer peripheries (evaluation: "Good"). Here, the evaluation criteria was set to 70%, but in actuality, it was confirmed based on the SEM images that in almost all samples, 90% or more of the particles included neither angular portions nor irregularities. On the other hand, FIG. 4, FIG. 5, FIG. 6, and FIG. 6 respectively show SEM images of Comparative Examples 1, 2, 6, and 10. According to FIG. 4 and FIG. 5, it can be seen that most of the particles in Comparative Examples 1 and 2 have angular, distorted particle shapes. A SEM image not very different from FIGS. 4 and 5 was also obtained for Comparative Example 4. According to FIG. 6 and FIG. 7, it can be seen that most of the particles exhibit crater-like planes in their surfaces, and have distorted particle shapes including angular portions and irregularities. SEM images not very different from FIGS. 6 and 7 were also obtained for Comparative Examples 7, 8, 9, 11, 12, and 13. Comparing the obtained SEM images, the difference between the particle shapes of the Examples according to the present invention and the particle shapes of Comparative Examples 1, 2, and 4 to 13 is readily apparent. Therefore, Comparative Examples 1, 2, and 4 to 13 were determined to have 70% or less particles that did not include any angular portions or irregularities in their outer peripheries (evaluation "Poor"). Accordingly, a significant difference could be seen between the Examples and the Comparative Examples in terms of the SEM image observation results as well.

In Examples 1 to 21, the mixing ratios were varied, with the amount of carbon added varying from 8 to 30 wt %, the calcium compound varying from 2 to 8 wt %, and the rare earth compound varying from 1 to 10 wt %, but no particular change in properties of the particle shapes between samples could be seen. On the other hand, as shown in Comparative Example 3, it was found that when the amount of carbon added is less than 3 wt %, it is not possible to produce a spherical aluminum nitride powder with properties similar to those of the Examples. In addition, in Examples 1 to 21, the heat-treatment temperature was varied from 1,500 to 1,800° C. and the holding time was varied from 1 to 48 hours, but no particular change in properties of the particle shapes between samples could be seen. On the other hand, as shown in Comparative Examples 4 and 5, it was found that when the heat-treatment temperature exceeds 1,850° C., and when the heat-treatment temperature is lower than 1,300° C., it is not possible to produce a spherical aluminum nitride powder with properties similar to those of the Examples.

In other words, by analysis of the SEM image, it was qualitatively and quantitatively confirmed that the spherical aluminum nitride powder according to Examples 1 to 21 has superior particle shape properties as a filler compared to those of the Comparative Examples.

Therefore, the spherical aluminum nitride powder according to the present embodiment (Examples 1 to 21), contains a rare earth compound as a subcomponent and is closer to a perfect sphere compared to the conventional art in terms of both individual particle shapes and the powder as a whole, and exhibits superior filling properties, kneading properties, and thermal conductivity as a filler.

The present invention is not limited to the embodiments and variants described above, and may be practiced in various aspects so long as they are within the technical scope of the invention. In other words, the present invention may be modified or altered by a person skilled in the art without departing from the spirit and scope of the invention. For example, other elements or components may be added to the configuration of the invention.

The invention claimed is:

1. A spherical aluminum nitride powder containing a main component consisting of AlN, and a subcomponent consisting of a rare earth compound,
   wherein an average particle size is 2 to 30 μm,
   wherein 70% or more of particles in the powder have a planar projection shape of each particle in which an outer peripheral shape does not include any protruding angular portions, the planar projection shape of each particle is obtained by a SEM image of the powder captured at a magnification rate of 10,000 and
   wherein 95% or more particles of all the powder have a sphericity of 0.7 or more.

2. The spherical aluminum nitride powder according to claim 1, wherein in the planar projection shape of each particle, the outer peripheral shape of the particle consists of a combination of arcuate portions that change gradually, and has no discontinuous points.

3. The spherical aluminum nitride powder according to claim 1, wherein an average particle size is 2.8 to 7.7 μm.

4. The spherical aluminum nitride powder according to claim 1, wherein 80% or more particles of all the powder have a sphericity of 0.8 or more.

5. The spherical aluminum nitride powder according to claim 1, containing 1 to 10 wt % of the rare earth compound on an oxide basis relative to 100 wt % of AlN, the rare earth compound being selected from at least one type of a group consisting of an oxide or aluminate compound of Y, Yb, La, Nd, or Sm.

6. The spherical aluminum nitride powder according to claim 1, wherein a specific surface area is 1.6 $m^2$/g or less.

* * * * *